United States Patent Office 3,418,299
Patented Dec. 24, 1968

3,418,299
PROCESS FOR THE PRODUCTION OF
VULCANIZABLE COPOLYMERS
Kurt Benedikter, Karl-Otto Hagel, and Norbert Wilke, Marl, Germany, assignors to Chemische Werke Hüls Aktiengesellschaft, Marl, Germany
No Drawing. Filed Jan. 26, 1965, Ser. No. 428,234
Claims priority, application Germany, Feb. 21, 1964,
C 32,219
16 Claims. (Cl. 260—85.3)

ABSTRACT OF THE DISCLOSURE

Copolymers of (a) at least one 1-olefin and (b) a Diels-Alder adduct of a triene and cyclopentadiene, prepared with a metal-organic mixed catalyst, are vulcanizable and suitable for the production of vehicle tires.

---

The present invention relates to a process for the production of vulcanizable copolymers. More particularly,

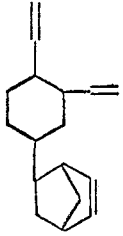

it relates to the production of sulfur-vulcanizable elastomeric low-pressure copolymers of olefins with trienes comprising the Diels-Alder adducts of trivinylcyclohexane and cyclopentadiene, using catalysts comprising metal-organic mixed catalysts.

The production of amorphous copolymers from 1-olefins using Ziegler-type catalysts is well-known. Such copolymers can be vulcanized by peroxides in the presence of sulfur. The production of peroxide-free sulfur vulcanization products, however, is obtained only when the copolymers used have been produced from certain types of polyolefins which contain extra double bonds. Multiolefins containing conjugated double bonds have been suggested for this purpose, as for example, butadiene or isoprene, or multiolefins with non-conjugated double bonds having at least one terminal double bond, such as hexadiene-1,5, and bicyclic dienes, such as dicyclopentadiene. There are certain disadvantages, however, in the use of these dienes. For example, conjugated dienes have a definitely inhibiting effect on the rate of polymerization and by cyclisations a great part of the double bonds of the hexadiene-1,5 become lost. On the other hand it is necessary to offer such a quantity of diene, as for example cyclopentadiene, that cross-linking is likely to occur in the product.

Trivinylcyclohexane has been proposed as a suitable multiolefin containing more than two double bonds, and copolymers having excellent properties are indeed obtainable therefrom, but relatively large quantities of the trivinylcyclohexane are required to accomplish this. This is likewise the case with other multiolefins, such as cyclopentadiene-1,5. Attempts have accordingly been made to find a polyolefin which would be required in only small amounts in the polymerization of olefins and at the same time produce sulfur-vulcanization products having good properties and without exerting any unfavorable influence on the polymerization, or in producing any undesired by-products.

It has now been found, according to the present invention, that the previous difficulties outlined above can be overcome and sulfur-vulcanizable elastomeric low-pressure copolymers of ethylene and/or higher 1-olefins and trienes can be produced in the presence of metal-organic mixed catalysts if the Diels-Alder adduct of trivinylcyclohexanene and cyclopentadiene is used as the triene.

Olefins suitable for the copolymerization of the present invention include ethylene, propylene, butene-1, pentene-1, hexene-1, decene-1, and branched 1-olefins, such as 4-methylpentene-1; other homologs may, of course, also be used. Ethylene or propylene, or mixtures thereof, and especially mixtures of ethylene and propylene, and mixtures of ethylene and butene-1 produce copolymers with unusually advantageous properties.

The Diels-Alder adducts of trivinylcyclohexane with cyclopentadiene can be produced simply and with high yields by heating trivinylcyclohexane (readily produced by isomerization of cyclododecatriene) in an autoclave with dicyclopentadiene at 180° C. for a period of 6 hours. The adducts thus produced are separated from the reaction product by vacuum distillation and have the following structures:

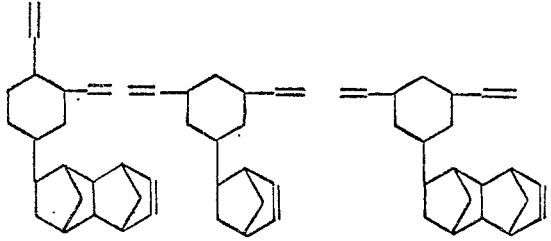

In carrying out the present invention the above adducts can be used either in pure form or as mixtures with each other for copolymerization with 1-olefins.

In carrying out the copolymerization of the present invention, molar ratios of 1-olefins to Diels-Alder adducts of the order of 1 to 0.01:1 to 0.5 can be used. When according to a preferred practice, several 1-olefins are used, e.g. a mixture of ethylene and propylene, the moleratios of ethylene:propylene:Diels-Alder adduct can be of the order to 1 to 10:1 to 10:0.005 to 1, and preferably 1 to 5:1 to 5:0.01 to 0.5, an especially advantageous ratio being 1:2:0.02.

Suitable metal-organic mixed catalysts for use in the process include, (a) compounds of metals of main Groups I to III inclusive of the Periodic Table in which the compounds contain at least one hydrogen atom or one alkyl or aryl group joined to the metal atom, and (b) compounds of the metals of subgroups IV to VI inclusive of the Periodic Table, as for example, vanadium.

Examples of suitable compounds of metals of main Groups I to III inclusive of the Periodic Table containing at least one hydrogen atom or one alkyl or aryl group joined to the metal atom include: amyl sodium, butyl lithium, diethyl zinc, and especially aluminum compounds such as trialkyl-triaryl- and triaralkyl-aluminum compounds, such as trimethyl aluminum, triethyl aluminum, triisobutyl aluminum, triphenyl aluminum, tri-(ethylphenyl)-aluminum, and mixtures thereof, dialkyl aluminum halides, such as diethyl aluminum chloride, and diethyl aluminum bromide, monoalkyl aluminum dihalides, such as monoethyl aluminum dichloride, and monoethyl aluminum dibromide. Catalysts which are especially advantageous include the alkyl aluminum sesquichloride mixtures formed from equimolecular amounts of dialkyl aluminum monochlorides and alkyl aluminum dichlorides, such as ethyl aluminum sesquichloride. Other suitable compounds include alkyl aluminum hydrides, such as diethyl aluminum monohydride, and diisobutyl aluminum monohydride.

Examples of suitable compounds of metals of side Groups IV to VI inclusive of the Periodic Table which can be used as catalysts include: titanium tetrachloride, chlortitanic acid esters such as dichlortitanic acid diethyl ester (Ti(OC$_2$H$_5$)$_2$Cl$_2$), and in particular, vanadium compounds such as vanadium trichloride, vanadium tetrachloride, vanadium oxytrichloride, vanadium esters such as vanadium triacetate (V(C$_2$H$_3$O$_2$)$_3$) and vanadium triacetylacetonate (V(C$_5$H$_7$O$_2$)$_3$).

The molar ratio of the mixed catalysts, i.e., aluminum-organic compound to the vanadium compounds, is of the order of 50 to 2:1, and preferably 12:1, or 10:1.

The copolymerization of the present invention can be effected under pressure, if desired, with the monomers in the liquified form, but the reaction can be carried out without the use of pressure. The copolymerization is preferably carried out in the presence of a solvent for the reactants which is inert under the conditions of the reaction, as for example, hydrocarbons or mixtures of hydrocarbons which are liquid under the conditions of the reaction, such as butane, pentane, hexane, cyclohexane, isopropylcyclohexane, petroleum fractions such as petroleum ether, aromatic hydrocarbons such as benzene, toluene, and xylene, chlorinated hydrocarbons such as chlorinated benzenes, or mixtures of such inert solvents. Mixtures of aliphatic and cycloaliphatic hydrocarbons, such as, for example, mixtures of hexane and isopropylcyclohexane, have been found especially suitable.

It has been found that the copolymerizations of the present invention can be satisfactorily carried out over a wide range of temperatures. Although not limited to such temperatures, it has been found that the copolymerization can be effected with especially advantageous results at temperatures ranging from −30° to +60° C.

The use of mixed catalysts which are soluble in the diluent used in the reaction is desirable. Especially suitable are catalyst products obtained by the reaction of vanadium compounds, such as vanadium tetrachloride and oxytrichloride, or vanadium esters with metal-organic compounds of aluminum, such as triethyl aluminum, triisobutyl aluminum, trihexyl aluminum, diethyl aluminum, monochloride or ethyl aluminum sesquichloride, in an inert diluent. By the addition of small amounts of modifying agents including alcohols, ketones, esters, ethers, and amines, the activity of the catalysts can be further controlled. Examples of suitable alcohols are ethanol and propanol, an example of a suitable ketone is acetone, examples of suitable esters are dibutyl fumarate and ethyl acetate, examples of suitable ethers are diethyl ether, anisol and tetrahydrofuran and examples of suitable amines are diethyl amine, triethyl amine, and tributyl amine.

The catalysts which are sensitive to air and moisture are preferably stored under a protective gas, such as nitrogen or argon.

When the copolymerization has reached the desired degree, the reaction can be stopped by the addition of alcohols or ketones to the reaction mixture.

The polymers produced by the reaction can be separated by known methods, as for example, by precipitation with alcohols or by the evaporation of the diluent, or by distillation of the solvent with steam.

Only very small amounts of the Diels-Alder adduct need be used to produce a product with good properties. As compared to trivinylcyclohexane, for example, only one-twentieth as much is necessary for the production of a vulcanizable product. When a somewhat larger amount is used, the number of double bonds built into the polymer will rapidly increase as in the case of other polyolefins. Because of this fact it is possible to produce by the present invention rapidly vulcanizable products.

The new copolymers of the present invention are especially suitable for production by continuous methods.

The copolymers of the present invention are amorphous, colorless and soluble in hydrocarbons. With only the small number of double bonds introduced by the small amounts of Diels-Alder adducts, a sufficient degree of cross-linking can be obtained during vulcanization. The polymerization products are easily vulcanizable and the vulcanized products have excellent properties. They can be extended with an unusually large amount of oil without too much detriment to their properties. In their resistance to ageing and to ozone, they are superior to natural rubber. Vulcanizates of these copolymers are suitable for the production of vehicle tires and industrial rubber articles.

The specific examples which follow are given for the purpose of illustrating the present invention. It is to be understood, however, that various modifications thereof will be obvious to one skilled in the art and that such modifications which do not depart from the concept of the invention are intended to be included within the scope of the appended claims.

EXAMPLE I

Into a glass reaction vessel provided with a stirrer, dropping funnel, gas inlet, gas outlet and regulatable outlet, 2 liters of hexane saturated with ethylene and propylene in the molar ratio of 1:2 were introduced, no pressure being employed. 75 liters of ethylene-propylene mixture and 5-(3,4-divinyl cyclohexyl)-bicyclo-[2,2,1]-heptene-(2) as a 3% by weight hexane solution were added to the reactor in such amount that the molar ratio of the monomeric ethylene:propylene:triene was 1:2:0.02, the triene being represented by the following structural formula:

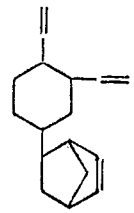

A hexane solution of vanadium oxychloride and ethyl aluminum sesquichloride was added to the reaction vessel in such amount that the vanadium oxychloride concentration was 1 mmol/l. hexane and the ethyl aluminum concentration was 12 mmol/l. hexane. The hexane passed through the reactor amounted to 2000 ml. per hour. The average residence time in the reactor was about one hour with the polymerization temperature maintained at 20° C.

The copolymerizing solution flowed into an agitated container in which the polymerization was stopped by the addition of water at which time the soluble catalysts were washed from the polymer solution. The hexane was removed from the washed polymer solution by steam distillation. The polymer, which occurred in the form of white crumbs, was dried under vacuum at 50° C. and then vulcanized at 160° C. using the following vulcanization formula:

| | Parts |
|---|---|
| Polymer | 100 |
| Stearic acid | 1 |
| Zinc oxide | 5 |
| HAF carbon black | 50 |
| Naphthenic oil | 10 |
| Sulfur | 1.5 |
| Mercaptobenzothiazole | 0.75 |
| Tetramethylthiuram disulfide | 1.5 |

The most important analytical data and the most important technical uses for the above are shown in Table I below.

Table I

| | |
|---|---|
| Solids content of the solution, percent by weight | 4.5 |
| RSV (reduced specific viscosity, measured in a 0.2% by weight solution in toluene at 27° C.) | 2.4 |
| Mooney viscosity ML-4 (DIN53523) | 85 |
| Propylene in polymer, percent by weight | 50 |
| Vinyl double bonds per 1000 carbon atoms | 3.1 |
| Tensile in kg./cm.$^2$ (DIN53504) | 260 |

Elongation in percent (DIN53504) _____ 440
Permanent set in percent (DIN53504) _____ 10
Elasticity in percent (DIN53512) _____ 48

If instead of propylene butene-(1) or a mixture of 50 mol percent propylene and 50 mol percent butene-(1) is used, the ethylene content in the copolymers is higher (60 to 65% by weight) and the Mooney viscosity is higher (ML–4 of 90 to 110). The tensile of the vulcanized copolymers is high (270 kg./cm.²).

EXAMPLE II

In this experiment the polymerization was carried out as described in Example I with the exception that the reaction temperature was maintained at 26° C. After stopping the polymerization and washing out the 4% by weight polymer solution with water, the solution was mixed with 37.5 parts of a naphthanic extender oil and the hexane removed by steam distillation.

The most important analytical data for the oil extended product and the most important technical uses of the elastomers produced with the vulcanization system sulfur / tetramethylthiuramdisulfide / mercaptobenzothiazole are shown in Table II below.

Table II

RSV (measured in a 0.2% by weight solution in toluene at 27° C.) _____ 1.3
ML–4 _____ 55
Propylene in polymer, percent by weight _____ 46
Vinyl double bonds per 1000 carbon atoms _____ 3.9
Tensile, kg./cm.² _____ 200
Elongation, percent _____ 450
Permanent set, percent _____ 15
Elasticity, percent _____ 46

EXAMPLE III

This experiment was performed as described in Example I above, using 60 liters of ethylene-propylene mixture and 5-(3,4-divinyl-cyclohexyl)-bicyclo[2,2,1]heptene-(2) per hour as a 3% by weight hexane solution, the ratio of the added ethylene:propylene:5-(3,4-divinyl-cyclohexyl)-bicyclo-[2,2,1]heptene-(2) being 1:2:0.1, and with the reaction temperature maintained at 20° C.

The most important data for the resulting polymer and for the vulcanizate produced with sulfur/tetramethylthiuramdisulfide/mercaptobenzothiazole are shown in Table III below.

Table III

Solids in solution, percent by weight _____ 4.0
RSV (measured in a 0.2% by weight solution in toluene at 27° C.) _____ 2.5
ML–4 _____ 100
Propylene in polymer, percent by weight _____ 45
Vinyl double bonds per 1000 carbon atoms _____ 20
Tensile kg./cm.² _____ 70
Elongation, percent _____ 310
Permanent set, percent _____ 11
Elasticity, percent _____ 50

EXAMPLE IV

In this experiment polymerization was carried out as described in Example I above using 75 liters of ethylene-propylene mixture and 9-(3,4-divinyl-cyclohexyl)-tetracyclo-[6,2,1,1³,⁶0²,⁷]-dodecen-(4) as a 3% by weight hexane solution in such a manner that the ratio of the added ethylene:propylene:triene was 1:2:0.02, and the reaction temperature being maintained at 20° C., and the triene being represented by the following structural formula:

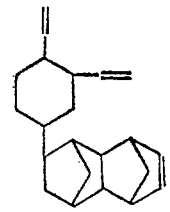

The analytical data for the polymer produced as above described and the most important properties of the vulcanizate produced with the system sulfur/tetramethylthiuramdisulfide/mercaptobenzothiazole is shown in Table IV below.

Table IV

Solids in solution, percent by weight _____ 4.6
RSV (measured in a 0.2% by weight solution in toluene at 27° C.) _____ 2.0
ML–4 _____ 80
Propylene in polymer, percent by weight _____ 4.9
Vinyl double bonds per 1000 carbon atoms _____ 5.0
Tensile, kg./cm.² _____ 230
Elongation, percent _____ 460
Permanent set, percent _____ 9
Elasticity, percent _____ 49

EXAMPLE V

The apparatus described by Example I has a throughput per hour of: 105 l. of ethylene-propylene mixture and 5-(3,4-divinyl-cyclohexyl)-bicyclo[2,2,1]heptene-(2) as a 3% by weight hexane solution in such a manner that molar ratio of monomers ethylene:propylene:5-(3,4-divinyl-cyclohexyl)-bicyclo-[2,2,1]-heptene-(2) is 1:2:0.03. VOCl₃ and ethyl-aluminum-sesquichloride will be added into the reactor to such extent that VOCl₃-concentration is 1 mmol/l. hexane and ethyl-aluminum-sesquichloride-concentration is 12 mmol/l. hexane. Moreover, as shown in Table 5 a modifying agent from the group of alcohols, ketones, esters, ethers, or amines is being added, by which polymerization activity is increased and Mooney viscosity (ML–4-value) is decreased. The hexane passed through the reactor amounts to 2000 ml. per hour, the pressure is 1 ata., with polymerization temperature maintained at 30° C. Analytical data are put down in Table 5.

TABLE 5

| Modifying Agent | Concentration of Modifying Agent in the Polym. Vessel, g./l. | Solids Content of Polymer Solution, percent by weight | RSV¹ | ML–4 | Propylene percent by Weight in the Polymer | Vinyl Double Bonds per 1,000 Carbon Atoms |
|---|---|---|---|---|---|---|
| Unmodified | | 4.6 | 2.5 | 90 | 52 | 3.4 |
| Ethanol | 1 | 6.6 | 1.2 | 45 | 50 | 3.5 |
| Isopropanol | 1 | 6.5 | 1.3 | 49 | 49 | 3.3 |
| Isopropanol | 1.5 | 6.8 | 1.1 | 41 | 53 | 3.6 |
| Acetone | 1 | 5.7 | 1.5 | 55 | 48 | 3.3 |
| Dibutyl fumarate | 1 | 7.0 | 1.2 | 45 | 48 | 3.3 |
| Ethyl acetate | 1 | 6.1 | 1.4 | 49 | 55 | 3.5 |
| Diethyl ether | 0.5 | 4.8 | 1.9 | 75 | 50 | 3.1 |
| Anisol | 0.5 | 4.9 | 1.9 | 73 | 48 | 3.2 |
| Do | 1 | 5.2 | 1.7 | 60 | 52 | 3.3 |
| Tetrahydrofuran | 1 | 5.5 | 1.7 | 62 | 53 | 3.3 |
| Tetrahydrofurane | 1.5 | 5.7 | 1.6 | 57 | 54 | 3.4 |
| Tributyl amine | 0.5 | 5.6 | 1.6 | 55 | 50 | 3.2 |

What is claimed is:

1. A catalytic process for the production of sulfur-vulcanizable elastomeric low pressure copolymers which comprises copolymerizing, as monomers, a mixture of (a) at least one 1-olefin and (b) a 1:1 to 1:2 triene/cyclopentadiene Diels-Alder adduct with a catalyst, the catalyst comprising (A) a metal compound containing at least one member selected from the group consisting of a hydrogen atom, an alkyl group and an aryl group, said member being joined to a metal of main Groups I to III, inclusive, of the Periodic Table, and (B) a compound of a metal of subgroups IV and VI inclusive of the Periodic Table.

2. A process according to claim 1 wherein the 1-olefin/(Diels-Alder adduct) molar ratio is 1 to 0.01:1 to 0.5.

3. A process according to claim 1 wherein the monomers are from 1 to 10 mols of ethylene, from 1 to 10 mols of propylene and from 0.005 to 1 mol of the Diels-Alder adduct of trivinylcyclohexane and cyclopentadiene.

4. A process according to claim 1 wherein the triene is trivinylcyclohexane.

5. A process according to claim 1 wherein the Diels-Alder adduct is 5-(3,4-divinyl-cyclohexyl)-bicyclo[2,2,1]heptene-(2).

6. A process according to claim 1 wherein the Diels-Alder adduct is 9-(3,4-divinyl-cyclohexyl)-tetracyclo-[6,2,1,1$^{3,6}$0$^{2,7}$]-dodecene-(4).

7. A process according to claim 1 wherein copolymerization is effected at temperatures ranging from −30 to +60° C.

8. A process according to claim 1 wherein the monomers and the catalyst are in solution, during copolymerization, in solvent inert to both said monomers and said catalyst.

9. A process according to claim 1 comprising copolymerizing the monomers with the catalyst and a modifying agent to control the activity of said catalyst, the modifying agent being a member selected from the group consisting of an alcohol, ketone, ester, ether and amine.

10. A process according to claim 1 wherein the compound of a metal of subgroups IV to VI is a member selected from the group consisting of titanium tetrachloride, a chlorotitanic acid ester and a vanadium compound.

11. A sulfur-vulcanizable elastomeric low-pressure olefin/(Diels-Alder adduct) copolymer wherin the olefin is at least one 1-olefin and the Diels-Alder adduct is a 1:1 to 1:2 triene/cyclopentadiene Diels-Alder adduct.

12. A copolymer according to claim 11 wherein the molar ratio of olefin/(Diels-Alder adduct) is (1 to 0.01)/(1 to 0.05).

13. A copolymer according to claim 11 wherein the Diels-Alder adduct is adduct of trivinylcyclohexane and cyclopentadiene.

14. A copolymer according to claim 11 wherein the Diels-Alder adduct is 5-(3,4-divinyl-cyclohexyl)-bicyclo[2,2,1]heptene-(2).

15. A copolymer according to claim 11 wherein the Diels-Alder adduct is 9-(3,4-divinyl-cyclohexyl)-tetracyclo-[6,2,1,1$^{3,6}$0$^{2,7}$]-dodecene-(4).

16. A copolymer according to claim 11 of from 1 to 10 mols of ethylene and from 1 to 10 mols of propylene per 0.005 to 1 mol of Diels-Alder adduct of trivinylcyclohexane and cyclopentadiene.

References Cited

UNITED STATES PATENTS

| | | | |
|---|---|---|---|
| 3,291,780 | 12/1966 | Gladding et al. | 260—80.5 |
| 3,222,331 | 12/1965 | Duck et al. | 260—80.5 |
| 3,163,611 | 12/1964 | Anderson et al. | 252—429 |

OTHER REFERENCES

Cram, D. J.: Hammond, G. S. Organic Chemistry, New York., McGraw-Hill Book Co., Inc., p. 350 relied on.

JOSEPH L. SCHOFER, *Primary Examiner.*

R. A. GAITHER, *Assistant Examiner.*

U.S. Cl. X.R.

260—79.5, 80.5, 80.7, 82.1